July 21, 1942.    G. W. BLAIR ET AL    2,290,729
RUBBER MATERIAL AND METHOD OF AND COMPOSITION FOR MAKING SAME
Filed March 23, 1936    2 Sheets-Sheet 1
Fig. 1.
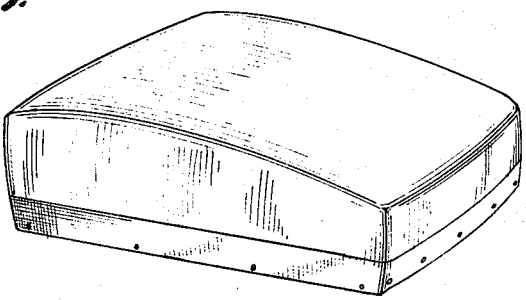
Fig. 2.
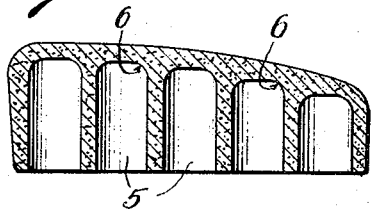
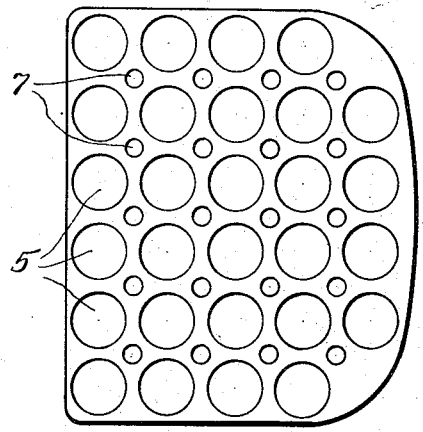
Fig. 3.
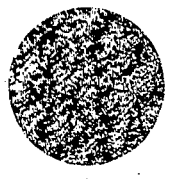
Fig. 4.
Inventor
George W. Blair
Charles E. Bradley
and John F. Schott
By Eugene M. Giles Atty.

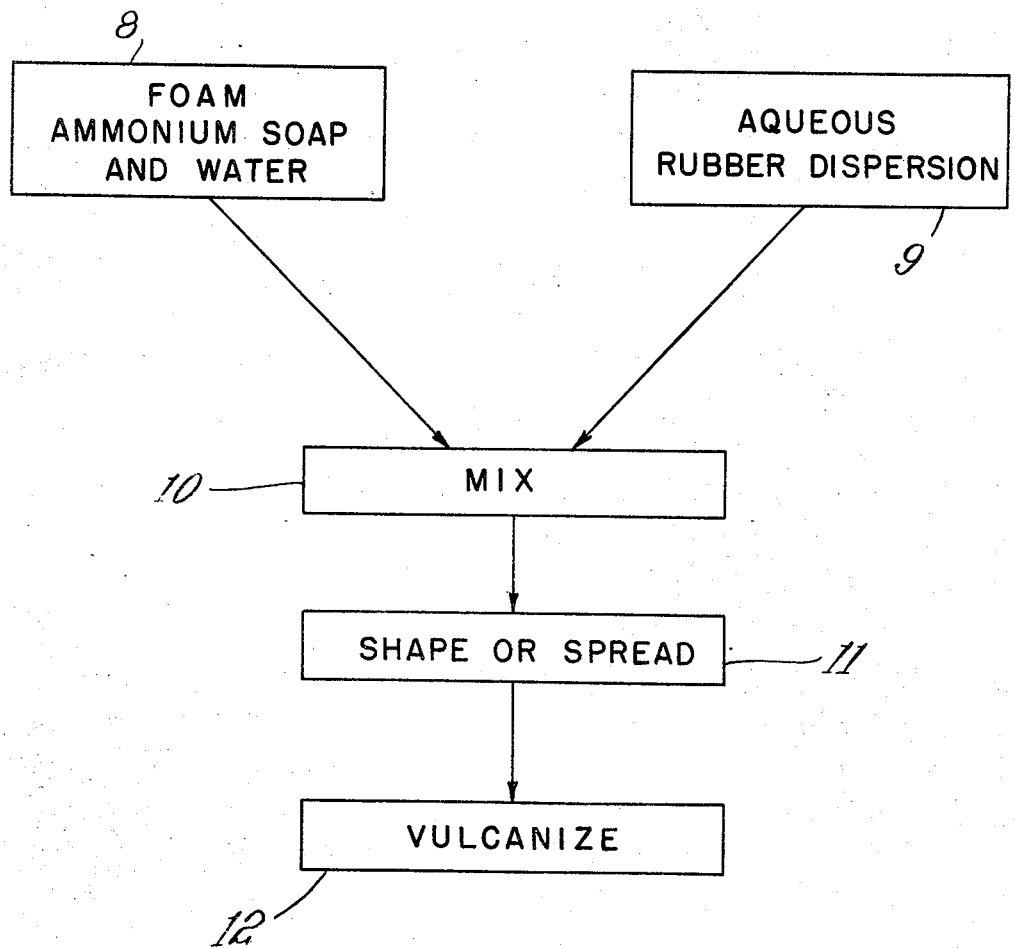

Patented July 21, 1942

2,290,729

UNITED STATES PATENT OFFICE 2,290,729

RUBBER MATERIAL AND METHOD OF AND COMPOSITION FOR MAKING SAME

George W. Blair, Charles E. Bradley and John F. Schott, Mishawaka, Ind., assignors to Mishawaka Rubber and Woolen Manufacturing Company, Mishawaka, Ind., a corporation of Indiana Application March 23, 1936, Serial No. 70,264

11 Claims. (Cl. 18—53)

Our invention relates to a soft open textured, or spongy material and the method of and composition for making same and has reference more particularly to a material of the character produced by infiltration of an aqueous dispersion of rubber, or the like, throughout a cellular, membranous mass such as a froth or foam.

The principal objects of our invention are to provide an improved material of rubber or the like and method of and composition for making same wherein the material has characteristics and properties which are particularly advantageous and desirable in seat cushions, mattresses and other articles of similar nature; to insure ample durability for prolonged use under constant and varying compression and flexing strains and other conditions to which seat cushions, mattresses and the like are subjected in use; to facilitate and simplify the making of such rubber material and permit convenient molding thereof in any desired sizes and shapes; and to insure accurate regulation of the soft feel and compressibility of the material, these and other objects being accomplished as pointed out in the following description wherein reference is made to the accompanying drawings in which, Fig. 1 is a perspective view of a type of seat cushion that may be made with the material disclosed herein;

Fig. 2 is a section through the cushion of Fig. 1, from front to rear and shows the form in which the seat cushion is preferably made from this material;

Fig. 3 is a bottom view of the seat cushion showing the openings and connecting wall structure that are preferably employed in seat cushions, mattresses and the like made of this material; and Fig. 4 is a full size view of a cut surface of rubber material made in accordance with this invention and is illustrative of the peculiar texture thereof.

Fig. 5 is a diagrammatic view or chart showing the several steps in the preferred method of producing spongy rubber material in accordance with the present invention.

In making the material of and in accordance with this invention, reference may be had to the chart of Fig. 5 wherein a cellular membranous distributing medium such as froth or foam, indicated at 8, is first prepared separately of a consistency suitable to insure proper distribution of the rubber or rubber like material to produce therefrom a cushion material of the desired softness and compressibility, and this separately prepared mass of froth or foam is then used as a vehicle by which to diffuse or distribute an aqueous dispersion of rubber 9 or the like in the open texture form in which it is vulcanized, the rubber dispersion being infiltrated into and throughout the foam, as for example in a mixing stage 10 by gently stirring the foam as the dispersion is added, and in a manner to substantially preserve the foam, and after thorough distribution of the aqueous dispersion of rubber throughout the foam, the rubber laden or impregnated foam may be poured into molds or spread out in slabs or sheets, as indicated at 11, and vulcanized by a suitable heat treatment indicated at 12.

We have found that an ammonium soap such as ammonium linoleate with water and a small amount of a neutral soap makes a foam that is especially suitable for the purpose, the amounts thereof used for a typical batch being as follows:

| | | |
|---|---|---|
| Ammonium linoleate | grams | 150 |
| Neutral soap | do | 15 |
| Water | c. c. | 850 |

Boiling water is employed in which the ammonium linoleate is dissolved and to which the soap is added and the solution is then whisked at high speed in the open bowl of a mechanical mixer until all the liquid has been converted into foam which takes approximately nine minutes for the batch with proper equipment. This results in a very tough and stable, water insoluble foam which will stand without returning to liquid form and in which the rubber dispersion may be readily and thoroughly incorporated without material collapse or breaking down of the foam.

The softness and compressibility of the finished material may be readily regulated by varying the amounts of ammonium linoleate and water in the batch, as for example a softer and more easily compressible material results if the following quantities are used, namely

| | | |
|---|---|---|
| Ammonium linoleate | grams | 260 |
| Neutral soap | do | 15 |
| Water | c. c. | 950 | and a harder and less easily compressible material results if the following quantities are used, namely

| | | |
|---|---|---|
| Ammonium linoleate | grams | 100 |
| Neutral soap | do | 15 |
| Water | c. c. | 750 | and varying degrees of softness or hardness may be obtained by otherwise varying the amounts of ammonium linoleate and water accordingly.

In the making of the foam with ammonium soap such as ammonium linoleate as above explained, evaporation and elimination of the ammonium constituent occurs leaving in the resultant foam free fatty acids which neutralize ammonia that may be present in the subsequently added rubber dispersion and gel or coagulate the rubber.

The dispersion of rubber that is mixed with the foam is preferably a creamed or concentrated latex of approximately 60% solids and low ammonia content of 0.5% or less and the dispersion may have compounding ingredients mixed therewith before introducing in the foam, or these compounding ingredients may be mixed in the foam producing materials and beaten up therewith into the foam. In practice we prefer to incorporate the compounding ingredients in the latex, a typical example of compounding ingredients and amounts thereof which we use being as follows:

|  | lbs.–oz. |  |
|---|---|---|
| Casein (insoluble) | 1 | 12 |
| Water | 33 | 8 |
| Ammonia, 28% | – | 7 |
| Tetramethyl thiuram disulphide | 3 | – |
| Triethyl trimethylene triamine | 6 | – |
| Licorice powder | 3 | 11 |
| Zinc oxide | 9 | 11 |
| Neozone D (phenyl beta-naphthylamine) | 18 | – |
| Sulphur | 11 | 10 | to which may be added dyestuff for coloring the finished product, if desired.

These compounding materials are ground together until they are thoroughly and finely divided, after which the mixture, which is in paste form, is gently stirred into the latex in the proportions of 1010 grams of the paste to three gallons of the latex. The compounded latex may be made in large batches, if desired, as the combined latex and paste compound will keep for months without deterioration or loss of effectiveness.

Three gallons of creamed or concentrated latex (approximately 60% solids) with 1010 grams of the compound or paste added thereto is then stirred into a batch of the ammonium linoleate foam prepared from and in accordance with the typical examples thereof or formulas therefor mentioned above, care being taken to avoid agitation to such extent that it may break down the foam and the stirring being discontinued as soon as the latex has been thoroughly dispersed or distributed throughout the foam. In practice we have found that a paddle of hook form is satisfactory for this stirring operation, the paddle being kept moving slowly throughout the mass of foam as the latex is poured therein and the stirring being continued thereafter until the latex is uniformly distributed throughout the mass. This requires about one minute stirring with the batches of foam contemplated in the examples thereof mentioned above, and the material is then ready for pouring into molds or spreading into sheets or slabs or in other desired form for vulcanization.

Increasing the amount of ammonium linoleate in proportion to the water as in the above formula for making the softer material, not only results in a larger volume of foam but also a tougher foam and with the given amount (three gallons) of latex there is a greater or more widespread distribution of the latex than when the given amount of latex is incorporated in the foam that is made with the lesser amount of ammonium linoleate and water, as in the above formula for making the harder material. Moreover there is some collapse or destruction of foam cells in stirring the latex into the foam which varies with the toughness of the foam and in the stirring of the latex into the foam a coarser or finer texture of rubber structure is evolved to some extent by the difference in the toughness of the foam.

For vulcanizing the material, the material may be subjected for about one-half hour to a temperature that is gradually increased to approximately 200° Fahrenheit, after which the temperature is increased to approximately 220° Fahrenheit and continued until the material is completely cured. However, it is preferred, and especially when it is desired to release the molds for re-use to remove the partially cured material from the vulcanizer and strip it from the mold after it has been subjected to the rising temperature for about one-half hour and to the higher temperature for about one hour and the vulcanization of the material in the molded form is then continued and completed in a compartment in which it is subjected to air at a temperature of about 180° Fahrenheit for about twelve hours during which time and by which procedure, the material is also dried. Water curing or conditioning is to be avoided as this washes out solvent materials that it is desirable to retain for their beneficial aging properties.

The casein and ammonia (for dissolving the casein) are used in the above formula of compounding ingredients merely as a dispersing agent for the other ingredients of the formula and a small quantity of a neutral soap may be substituted therefor, while the licorice powder, which may, if desired, be mixed with the foam producing material instead of with the compounding ingredients and the triethyl trimethylene triamine have particular advantages in this connection, the former having the effect of toughening and stabilizing the foam as well as imparting a pleasing odor, and the latter having desirable accelerating, aging and heat sensitizing properties.

This material may be molded in any desired sizes and shapes and used for any desired purpose, although it is especially adapted for seat cushions, mattresses and other similar cushioning purposes. For seat cushions and the like such as shown in Fig. 1, it is preferably molded with large rounded openings 5 extending upwardly close to the top and with the upper ends rounded as shown at 6. Smaller round openings 7 may also be provided extending upwardly to substantially the same elevation as the openings 5 and likewise rounded at their upper ends.

It has been proposed to make a rubber cushioning material by mixing a foaming agent, such as soap, with latex and beating the combined mixture with vulcanizing ingredients into a vulcanizable foam. The mixing of the liquid soap with the latex, however, has an undesirable stabilizing effect on the latex which we have found to be avoided by incorporating the latex in a separately prepared foam. Moreover, our procedure produces a material of different structure and appearance and having characteristics and properties by reason of which it makes a cushion that is far superior to those made with beaten latex and soap. Our material has a rough, fluffy, loose texture somewhat like hand kneaded home made bread whereas the beaten latex type of material above referred to is of a comparatively fine and smooth cellular texture somewhat like bakery bread that has been mechanically mixed to a uniform, smooth consistency, and a cut surface of our material presents a rough, crumby appearance and open brashy texture with numerous irregular scraggly openings and passageways disappearing into the mass, as indicated in Fig. 4, while a cut surface of the beaten latex material presents a smooth cellularly pitted appearance with innumerable small cellular pits of varying sizes, and when stretched our material has the appearance of numerous fluffy crumbs held together by filaments or tendons, while the beaten latex material when similarly stretched has the appearance of a mass of filaments or tendons.

Moreover there is greater freedom for air circulation in our material as shown by breathing tests in which it required over fifty per-cent more time to pass a given amount of air through the beaten latex material than through our material under the same conditions, the flexing, aging and riding properties of our material are superior and our material has a much greater lag which is a greatly desired property in cushions to minimize rebound. Furthermore, in tests for serviceability and endurance, cushions made from our material withstood the same serviceability, and endurance tests over four times as long as the beaten latex cushions without breaking down.

While we have for purposes of illustration and disclosure indicated herein certain materials and quantities thereof and procedure that may be employed in practicing our invention, we are aware that various changes and modifications may be made without departing from the principles of our invention, the scope of which is to be determined by the appended claims.

We claim as our invention:

1. In a method of making a spongy rubber material from an aqueous rubber dispersion, the step which comprises mixing an aqueous dispersion of rubber with a free fatty acid containing foam of a de-ammoniated ammonium soap.

2. In a method of making a spongy rubber material from an aqueous rubber dispersion, the step which comprises mixing an aqueous dispersion of rubber of less than five-tenths of one percent ammonia content with a foam containing free fatty acid.

3. The method of making a spongy rubber material which said method comprises combining an aqueous dispersion of rubber with foamed ammonium linoleate and vulcanizing the mixture.

4. In a method of making a spongy rubber material from an aqueous rubber dispersion, the step which comprises combining an aqueous dispersion of rubber and a licorice stabilized foam.

5. The method of making a spongy rubber material which said method comprises foaming ammonium linoleate with water and a dispersing agent, mixing with rubber latex compounding ingredients including sulphur, zinc oxide and triethyl trimethylene triamine, combining the latex and compounding ingredients with the foamed ammonium linoleate and including licorice powder therewith, and thereafter vulcanizing the resulting admixture.

6. The method of making a spongy rubber material which said method comprises preparing a foam stable to aqueous dispersions of rubber and of a predetermined density selected for a certain texture of product, then admixing an aqueous dispersion of rubber without the separately prepared foam and vulcanizing the mixture in the product form.

7. In a method for the production of sponge rubber from an aqueous rubber dispersion, the step which comprises admixing aqueous rubber dispersion with a separately prepared foam stable to said aqueous rubber dispersion.

8. A method for the production of sponge rubber from an aqueous dispersion of rubber by coagulation of a constituent of the dispersion in the presence of bubbles of gas distributed therethrough which comprises separately preparing a foam which is substantially permanent in the presence of aqueous rubber dispersion by distributing a gas through a foam-forming composition stable in latex, uniformly admixing the said foam with an aqueous rubber dispersion, causing coagulation in the said admixture without breaking down the foam structure and vulcanizing the rubber in the said admixture.

9. The method of producing spongy rubber, which comprises admixing compounded rubber latex with a separately prepared foam stable to the latex, then shaping and vulcanizing the admixture in the form of the finished product.

10. A spongy rubber product comprising a vulcanized admixture of an aqueous dispersion of rubber and a separately prepared foam stable to said aqueous rubber dispersion.

11. In a method for the production of sponge rubber from an aqueous rubber dispersion by coagulation of the dispersion in the presence of bubbles of gas distributed therethrough, the steps which comprise admixing the dispersion with a separately prepared foam of a foam-forming material and a bubble-forming gas, said foam being of a character stable to the dispersion, and coagulating the rubber of the dispersion.

GEORGE W. BLAIR.
CHARLES E. BRADLEY.
JOHN F. SCHOTT.